United States Patent [19]

Reid

[11] Patent Number: 4,602,452
[45] Date of Patent: Jul. 29, 1986

[54] FISHING LURE WITH ANGLED END FACES AND ROTATABLE ON THE LINE

[76] Inventor: Kenneth Reid, R.R. #4, Duncan, British Columbia, Canada

[21] Appl. No.: 447,145

[22] Filed: Dec. 6, 1982

[51] Int. Cl.$^4$ ............................................. A01K 85/00
[52] U.S. Cl. .................................. 43/42.45; 43/42.05; 43/42.36
[58] Field of Search ................. 43/42.05, 42.36, 42.45, 43/42.46, 42.48, 42.19, 42.20, 42.21

[56] References Cited

U.S. PATENT DOCUMENTS

| | | | |
|---|---|---|---|
| 1,390,458 | 9/1921 | Moree | 43/42.48 |
| 1,394,313 | 10/1921 | Leeper | 43/42.48 |
| 1,611,644 | 12/1926 | Johnson | 43/42.48 |
| 2,494,093 | 1/1950 | Hill | 43/42.48 |
| 2,498,800 | 2/1950 | Fehely | 43/42.45 |
| 2,506,263 | 5/1950 | Bessinger | 43/42.48 |
| 2,522,179 | 9/1950 | Jensen et al. | 43/42.46 |
| 2,565,205 | 8/1951 | Culver | 43/42.48 |
| 2,940,206 | 6/1960 | Agnew | 43/42.36 |
| 3,440,756 | 4/1969 | Leadbetter | 43/42.36 |
| 3,885,339 | 5/1975 | Herkner | 43/42.36 X |
| 3,982,349 | 9/1976 | Hills | 43/42.48 |
| 4,164,826 | 8/1979 | Metzler et al. | 43/42.48 X |

FOREIGN PATENT DOCUMENTS 934962  10/1973  Canada ................................... 43/53

*Primary Examiner*—Nicholas P. Godici
*Assistant Examiner*—M. Jordan
*Attorney, Agent, or Firm*—Fulwider, Patton, Rieber, Lee & Utecht

[57] ABSTRACT

A fishing lure has an elongated body which is reversely curved to dispose inclined end faces of the body on opposite sides of and directed away from a middle portion of the body. The curvature near one end face is greater than the curvature near the other end face. A longitudinally extending passageway in the body threadedly receives a leader used to attach a hook as well as the lure to a fishing line. The arrangement allows the lure to be moved through water in one direction to impart a selected rotative movement to the body and to be moved in the opposite direction to impart a slightly different rotative movement.

1 Claim, 4 Drawing Figures

FISHING LURE WITH ANGLED END FACES AND ROTATABLE ON THE LINE

FIELD OF THE INVENTION

This invention relates to an artificial fishing lure or bait.

DESCRIPTION OF THE PRIOR ART

There are many types of lures available to fisherman but most are designed to perform best when used for a particular method of fishing. For example, a lure intended to be used primarily for trolling may be shaped and coloured to simulate a small fish such as a herring and very often the shaping is such as to impart a swimming action to the lure as it is drawn through the water behind the boat. A trolling lure will not perform satisfactorily if not used as intended and the same thing may be said of other specialized lures some of which are relatively complex and expensive.

SUMMARY OF THE INVENTION

The present lure on the other hand is a simply constructed and inexpensive device which occupies a minimum amount of space in a fishermans tackle box. The shape given to the present lure makes it reversible, that is, it can be moved through the water in either direction to provide a different action according to the direction of travel and this makes the lure suitable for trolling as well as drift fishing with one lure of an appropriately small size being suitable for spin casting as well.

More specifically, a device according to the present invention may be defined as a fishing lure which comprises an elongated body which is reversily curved in a horizontal plane extending through the longitudinal axis of said body said elongated body having opposite end faces inclined in opposite directions with respect to the longitudinal axis of the elongated body, and rigging means for attaching the elongated body to a fishing line whereby longitudinal movement of the body in either direction through water exerts a force on the leading opposite end face tending to rotate the body generally about the longitudinal axis.

DESCRIPTION OF THE PREFERRED EMBODIMENTS

Figure 3:
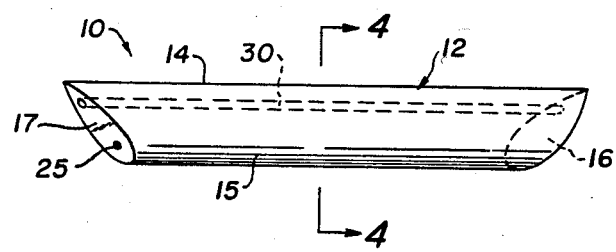
FIG. 3 is a side elevation of the lure.
Figure 4:
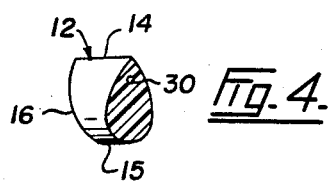
FIG. 4 is a transverse section taken on the line 4—4 of FIG. 3.

Referring to the drawings, the present fishing lure is indicated generally by the numeral 10. The lure 10 has an elongated body 12 which may be formed of partly coloured or suitably painted plastic. The body has a top ridge 14 and a transversely rounded bottom surface 15 which ridge and surface preferably are parallel to one another as shown best in FIG. 3. Between the ridge 14 and surface 15, the body curves outwardly so as to appear substantially pear shaped in cross section. This cross sectional shaping is exaggerated at opposite end faces 16 and 17 of the body since those faces are inclined in opposite directions with respect to the longitudinal axis of the body. In other words, end faces 16 and 17 converge inwardly from the top ridge 14 to the bottom surface 15 as will be appreciated best from viewing FIG. 3.

Figure 2:
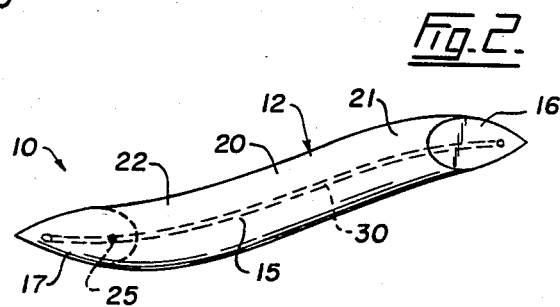
FIG. 2 is a plan view of the underside of the lure.

The elongated body 12 is reversely curved between the end faces 16 and 17, see particularly FIG. 2, the curvature being in a horizontal plane extending through the longitudinal axis of the body. Starting at a straight portion 20 located at about the middle of the body, the lure will be seen to have another portion 21 which curves outwardly away from the middle portion in one direction and which terminates at the end face 16. The degree of curvature is relatively greater in a third portion 22 of the body which extends from the middle portion to the end face 17. Thus, the reverse curving is in a horizontal plane which is assumed to extend through the longitudinal axis of the body but the curvature is greater in the portion 22 than in the portion 21.

Figure 1:
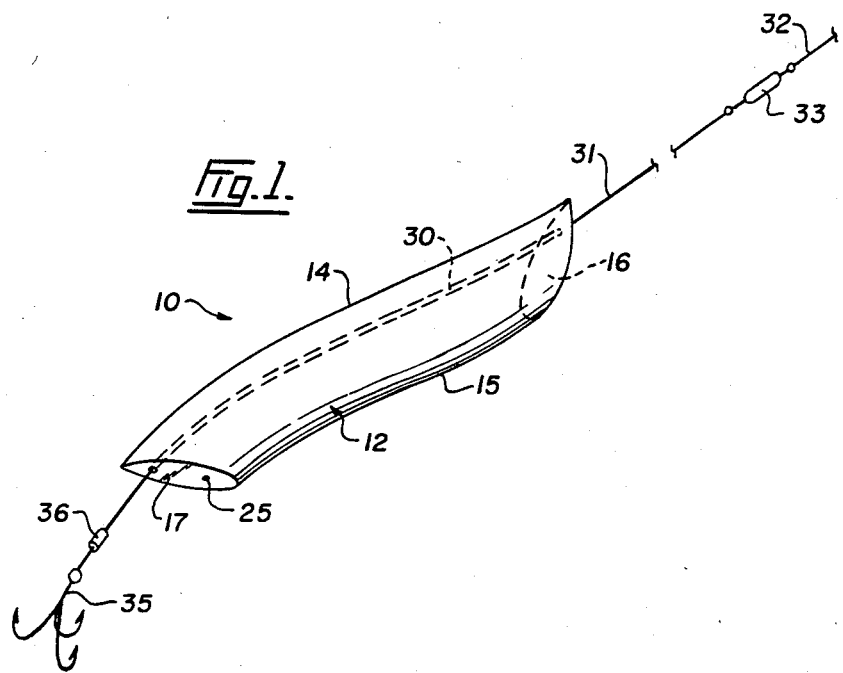
FIG. 1 is a perspective view of the present fishing lure.

FIG. 1 shows the lure rigged to move through the water from left to right so that the end face 16 is the leading end of the lure. End face 17 then becomes the trailing end of the lure and it will be noticed the unequal reverse curving disposes the inclined end faces in opposite directions relative to the middle portion 20 of the body. There is a dot indicated by the numeral 25 on the trailing end face 17 of the lure to distinguish that face from the leading end face 16.

The body 12 is provided with a longitudinally leading end face 16. extending passageway 30 which is located closer to the top ridge 14 than to the bottom surface 15. A leader 31 is threaded through the passageway 30, see FIG. 1 only. One end of this leader is adapted to be secured to an end of a fishing line 32 by means of a swivel 33. The other end of the leader is attached to a hook 35 which may be the triple barbed type shown in FIG. 1. Preferably, the leader 31 is fitted with a bumper 36 located between the hook 35 and the end face 17.

The fishing lure 10 is rigged as shown in FIG. 1 for fishing in various ways one of which is commonly referred to as drift fishing. That is to say, the fishing is usually done from a boat in deep water. A rod carries the fishing line 32 and the lure 10 is lowered to the required depth whereupon the fisherman periodically lifts the end of the rod to raise and lower the lure. The end face 17 bearing the dot 25 is at the lowermost end of the lure at this time. As the lure is raised in the water, the end face 16 acts as a planing surface in the water and a force is imposed on the body 12 which causes it to rotate slightly about its own longitudinal axis. The rotation is not too rapid and may not be over a full 360° due to the position of the inclined end face 16 and the relatively slight curvature of the portion 21 but the overall movement is somewhat similar to that which might be made by a small bait fish. The lowering motion of the lure is made quite slowly to avoid too much slack in the fishing line and it is the end face 17 which then tends to twist or rotate the lure. The portion 22 has the greatest amount of curvature and the end face 17 is offset from the middle portion 20 to a greater extent than the end face 16. As a result, the rotative movement of the body is proportionately greater in relation to its speed of movement through the water and the resulting movement of the lure as it is allowed to sink in the water has been likened to that of a wounded herring. Movement of this kind is known to attract game fish which are encouraged to strike at the lowering lure so as to be caught by the hook.

The lure 10 may be rigged in the above-described manner when it is to be trolled behind a boat during salmon fishing. However, if the fisherman decides that a faster or more pronounced rolling action would be best, he places the hook 35 near the end face 17 to achieve that result. Factors such as the speed and depth at which the trolling is to be done, the condition of the water and so on may persuade the fishermen that rotation of the lure should be speeded up and this is done by reversing the body 12 on the leader. The leader 31 is threaded through the passageway 30 so that the end face 17 will be the leading end of the lure as indicated by the dot 25. Again the face 17 and portion 22 combine to give a faster speed of rotation which, under certain circumstances, would be more likely to attract salmon than would be the case if the body was mounted on the leader in reverse.

From the foregoing, it will be apparent there is provided a versatile lure which offers two distinct fishing actions for both drift fishing and trolling. A slightly smaller version of the lure has been found advantageous to use when spin casting as well.

I claim:

1. A fishing lure having an elongated body reversely curved in a horizontal plane extending through the longitudinal axis of the body, said elongated body having a straight middle portion and curved end portions, one of the curved end portions having a greater length of curvature than the other end portion, said straight middle portion and curved end portions being substantially pear shaped in cross section, said elongated body having opposite end faces substantially plane and inclined in opposite directions with respect to the longitudinal axis, and rigging means for attaching the elongated body to a fishing line, said rigging means comprising a length of leader, said elongated body having a longitudinally-extending passageway through which the leader is threaded, to located a selected opposite end face near a hook attached to a fishing line by the leader, so that longitudinal movement of the body in either direction through water can exert a force on the leading end face which causes rotation of the body generally about the longitudinal axis.

* * * * *